United States Patent [19]

Yianilos

[11] Patent Number: 5,640,552

[45] Date of Patent: Jun. 17, 1997

[54] METHOD AND APPARATUS FOR PROVIDING MULTI-LEVEL SEARCHING IN AN ELECTRONIC BOOK

[75] Inventor: Peter Nicholas Yianilos, Princeton, N.J.

[73] Assignee: Franklin Electronic Publishers, Incorporated, Mt. Holly, N.J.

[21] Appl. No.: 395,160

[22] Filed: Feb. 27, 1995

Related U.S. Application Data

[60] Continuation of Ser. No. 36,622, Mar. 24, 1993, abandoned, which is a division of Ser. No. 529,867, May 29, 1990, abandoned.

[51] Int. Cl.[6] .................................................. G06F 17/30
[52] U.S. Cl. ........................................................ 395/605
[58] Field of Search ....................... 364/DIG. 1, DIG. 2; 395/600, 605

[56] References Cited

U.S. PATENT DOCUMENTS

| | | | |
|---|---|---|---|
| 4,159,417 | 6/1979 | Rubincam | 235/375 |
| 4,420,816 | 12/1983 | Yoshida | 364/900 |
| 4,674,066 | 6/1987 | Kucera | 364/900 |
| 4,823,306 | 4/1989 | Barbic et al. | 364/900 |
| 4,855,725 | 8/1989 | Fernandez | 345/173 |
| 4,923,314 | 5/1990 | Blanchard, Jr. et al. | 400/63 |
| 5,056,021 | 10/1991 | Ausborn | 364/419 |
| 5,168,565 | 12/1992 | Morita | 395/600 |
| 5,201,048 | 4/1993 | Coulter et al. | 395/600 |
| 5,210,868 | 5/1993 | Shimada et al. | 395/600 |
| 5,212,650 | 5/1993 | Hooper et al. | 364/489 |
| 5,233,333 | 8/1993 | Borsuk | 345/127 |
| 5,241,671 | 8/1993 | Reed et al. | 395/600 |
| 5,256,067 | 10/1993 | Gildea et al. | 434/169 |
| 5,297,039 | 3/1994 | Kanaegami et al. | 364/419.13 |
| 5,365,598 | 11/1994 | Sklarew | 382/189 |
| 5,375,235 | 12/1994 | Berry et al. | 395/600 |
| 5,404,518 | 4/1995 | Gilbertson et al. | 395/600 |

OTHER PUBLICATIONS

APS Text Search & Retrieval—Classroom Manual, Planning Research Corp., May 1987, Chap. 2, pp. i, 3–6 & 27–38.

*Primary Examiner*—Thomas G. Black
*Assistant Examiner*—Maria N. Von Buhr
*Attorney, Agent, or Firm*—McAulay Fisher Nissen Goldberg & Kiel, LLP

[57] ABSTRACT

A technique for providing simplified and more flexible text recovery in an electronically stored text. The text storage device is of the hand-held type and may accommodate the text of the entire bible, for example. The user may access the stored text in a read or search mode. The device is programmed to perform certain functions automatically, such as: selecting search or read mode; accommodating different syntax formulations; providing a fixed screen map of respective different portions of the text; and visually indicating specific words of a search to which a search will be limited. Expanded flexibility is also programmed into the device which includes: optionally expanding searches to cover both different forms of the same words and unrelated words having the same meaning; providing assistance to the user upon request which takes into account the current operational phase; and providing the capability of tagging a preselected location in the text for simplified access during reacquisition.

2 Claims, 9 Drawing Sheets

Microfiche Appendix Included
(6 Microfiche, 311 Pages)

ELECTRONIC BOOKMARKS

THERE ARE A GIVEN NUMBER OF "BOOKMARKS" SUPPLIED, THAT ARE EACH EITHER EMPTY OR ASSIGNED TO A LOCATION IN THE ELECTRONIC BOOK.

SETTING A BOOKMARK:

GOING TO A MARKED LOCATION:

NOTE: IT IS POSSIBLE TO PRESS HELP WHILE READING HELP INFORMATION, AND RECEIVE INFORMATION ABOUT THE HELP SYSTEM

METHOD AND APPARATUS FOR PROVIDING MULTI-LEVEL SEARCHING IN AN ELECTRONIC BOOK

This is a continuation of application Ser. No. 08/036,622, filed Mar. 24, 1993, now abandoned, which was a divisional of application Ser. No. 07/529,867, filed May 29, 1990, now abandoned.

CROSS REFERENCE TO RELATED APPLICATION

Reference is made to the application entitled "Electronic Text" by the same inventor filed simultaneously herewith. The contents of that application are incorporated herein by reference.

MICROFICHE APPENDIX

A microfiche appendix is attached having 6 microfiche and 311 pages.

BACKGROUND OF THE INVENTION

The present invention relates to techniques for accessing textual information stored in an electronic memory and for providing simplified and more flexible text accessing techniques to the user.

More particularly, the present invention relates to an electronically stored text in a hand-held device having a keyboard and screen wherein various keys in distinct sequences may be actuated to interactively provide different modes for analyzing the text. The device is programmed to minimize user interaction in a number of such modes.

Electronic devices for providing word-related operation and manipulation are known. Such devices, such as the Electronic Spelling Machine disclosed in U.S. Pat. No. 4,830,618, include a keyboard, screen and permanent electronic storage, i.e., a read-only memory. Techniques for the retrieval of individual words, however, are not necessarily appropriate when dealing with electronic storage of a complete comprehensive text.

When considering the presentation of a full text, such as the Bible, in a hand-held machine intended for personal and repeated use, it is important to provide techniques which avoid excessive keyboard manipulation and at the same time provide a variety of approaches for accessing, using and reusing the stored text.

It is an object of the present invention to provide a simplified but varied and effective technique for accessing electronically stored textual information.

It is a further object of the present invention to provide such a technique in a hand-held text storage machine.

In accordance with the invention, in a method for providing user access to stored textual information in an electronic book, the method having search and read modes of access, the improvement comprises providing simplified and more flexible user operation steps. These steps include selecting search or read mode automatically, accommodating different syntax formulations of an entry word or phrase in the read mode, optionally expanding searches to cover different forms of the same word and unrelated words having the same meaning, providing the capability of tagging a preselected location in the text for simplified access during reacquisition of textual information, providing a map of different fixed locations on the screen corresponding to respective different portions of the text, providing assistance to the user upon request which takes into account the current operational phase and visually indicating specific words of a search request to which a search will be limited.

For a better understanding of the present invention, reference is made to the following description and accompanying drawings while the scope of the invention will be pointed out in the appended claims.

BRIEF DESCRIPTION OF THE DRAWINGS

Referring to the drawings.

DESCRIPTION OF THE PREFERRED EMBODIMENTS

Figure 1:
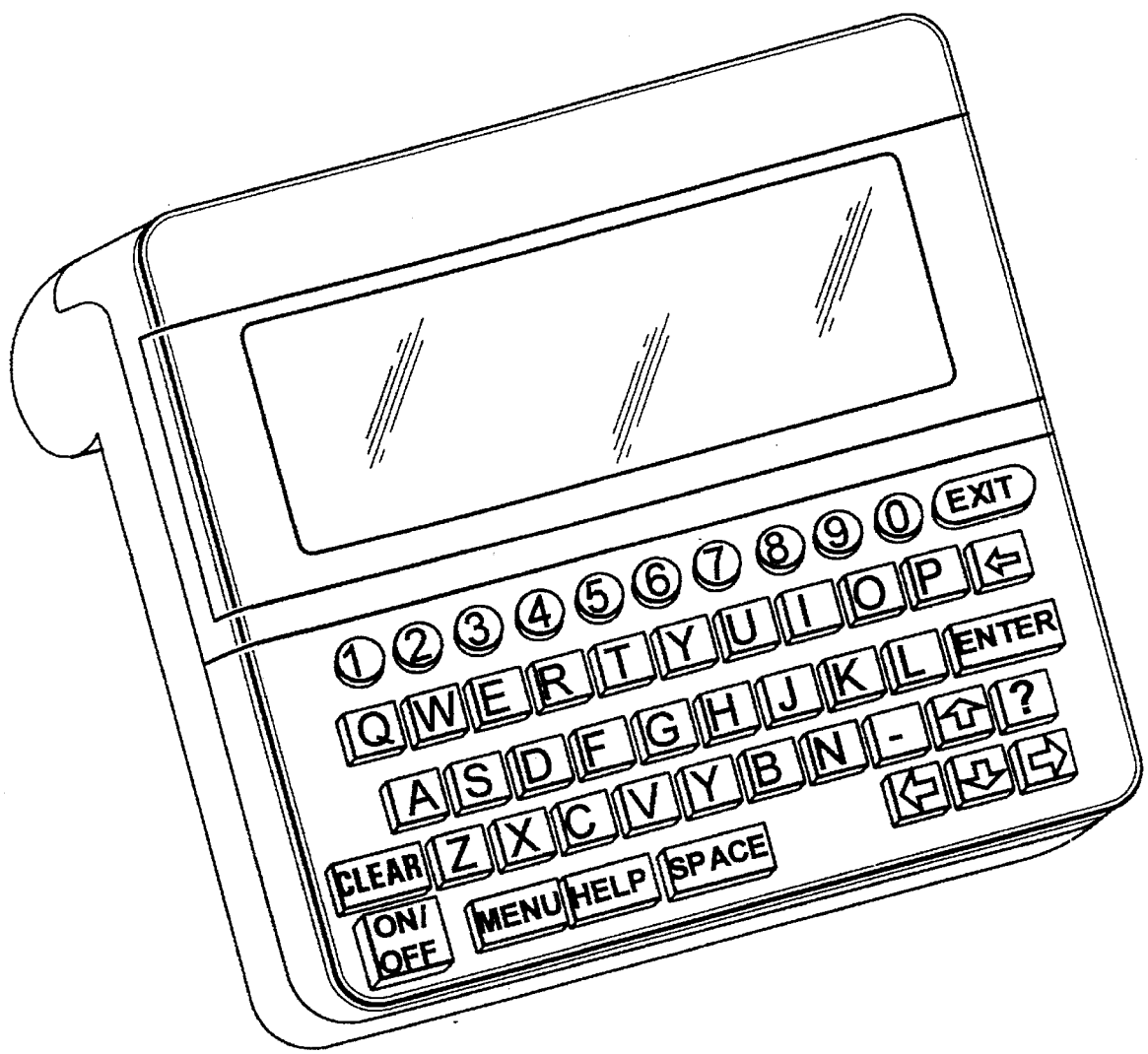
FIG. 1 is a perspective view of an embodiment of the present invention.

An embodiment of the present invention shown in FIG. 1, incorporates, as stored text, the King James version of the Holy Bible.

The device 10 includes a keyboard 11 and screen 12. The keyboard 11 presents the standard keys of an ordinary typewriter and other more or less standard operating keys of a word processor. The latter include the CLEAR, MENU, HELP, ENTER, EXIT and CURSOR CONTROL KEYS. An ON/OFF control is also included.

The user of any stored textual material may desire to read designated sections, e.g., chapter and verse of the Bible, or may desire to find a specific section by entering a key word or words (by searching).

Automatic Mode Selection

In the device of the present invention, these two basic functions, "read" and "search", are determined automatically without requiring user mode selection. This is done by the device 10, by parsing the input string (the word or words entered on the screen) and switching into the appropriate mode.

Specifically, the user need only press the ON/OFF switch, type in the inquiry, press ENTER and get a result. The results will require further steps such as selection within the result (discussed below) or advancing the text in order to read the text presented. The important thing is that the user obtains the result after entering the inquiry without having to select a mode.

The parsing operation is defined as follows.

The user's query is submitted to the parser, which tries to parse it as a read-mode request. Read-mode requests consist of a "book" (with optional "volume" specifier attached), an optional "chapter", and (if a chapter has been specified) a "verse". If a query fails to parse as a read-mode request, the parser BAILS OUT and treats it as a search request.

The parser starts at the beginning of the query. If it manages to isolate a book/volume name, it moves past this and then, from its new position in the query, attempts to isolate a chapter specification, etc.

Figure 2A:
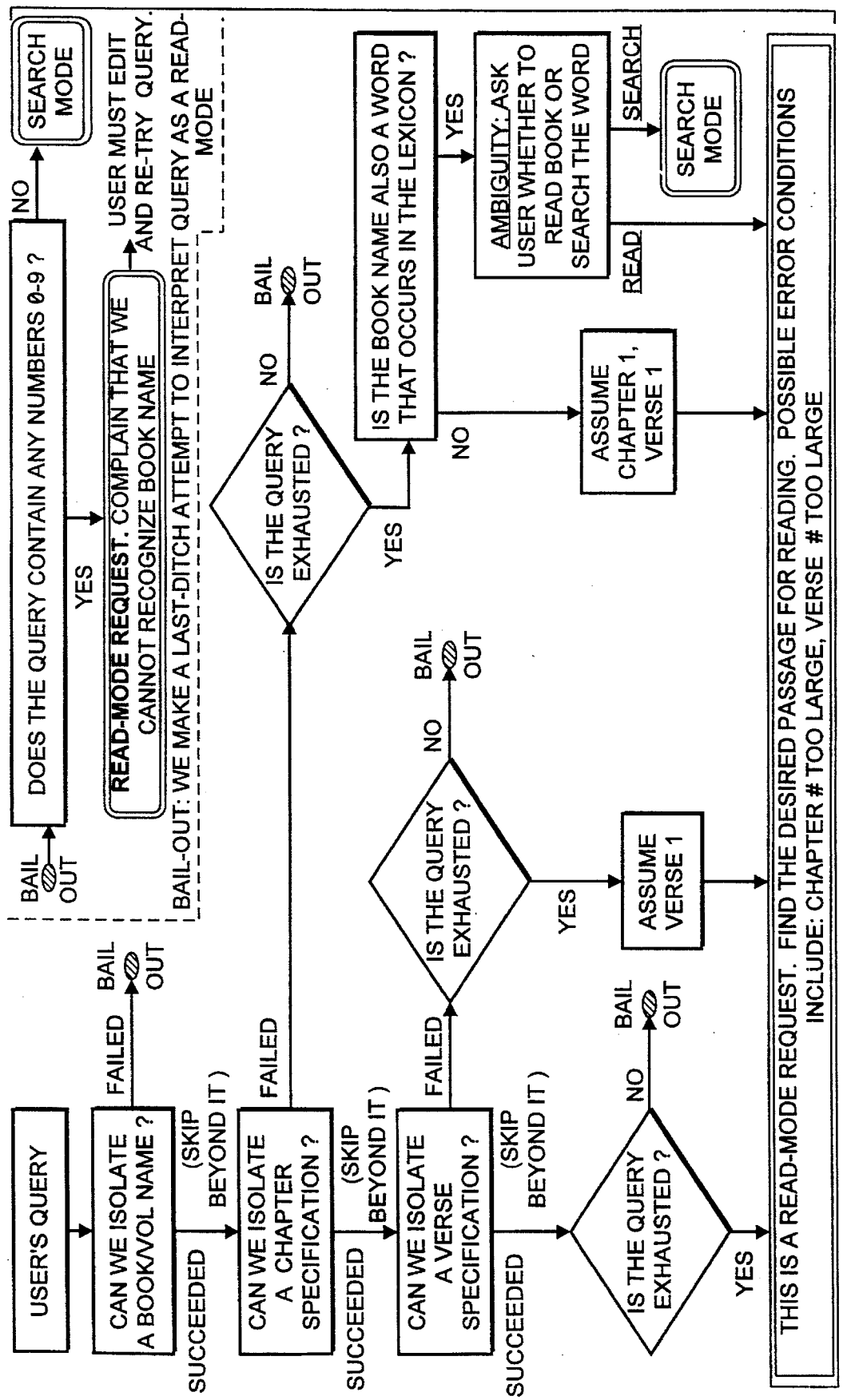
FIGS. 2a–2g are flow charts indicating the significant logical steps in effecting the various features of the present invention.

A flow chart of the automatic mode selection step is presented in FIG. 2a.

In FIG. 2a, all of the paths are directed to whether the query or request is a read-mode request. Starting with the user's query, the first step is to determine whether a book or volume name can be isolated. If so, the next step is to determine whether a chapter specification can be isolated. If so, the next step is to determine whether a verse specification can be isolated. If so, and if the query is exhausted, it is determined that this is a read-mode request.

Other flow chart paths indicated which result in a read-mode request assume verse 1 or assume chapter 1, verse 1. One flow chart path questions whether the book name is also a word that occurs in the lexicon which, if yes, triggers a request to the user as to whether to read the book or search the word. This results in either a read-mode request or search mode request depending on the response.

In various steps of the chart, failure leads to a "bail out" condition, this is a last ditch attempt to interpret the query as a read-mode. What is done is to determine whether the query contains any numerals 0–9. If not, then it is determined that it is a search mode. If so, it is decided that it is a read mode request and the user is told that the book mode cannot be recognized and the user must edit and re-try the query.

There are certain situations in which the input is inherently ambiguous as to whether the "search" mode or "read" mode is required. Thus, for example, if an individual enters LUKE, it is not clear as to whether the individual wishes to read the books of LUKE or wishes to locate all of those positions in the Bible where the name "Luke" appears. In such situation, the machine will ask the user to select whether to "read" or "search" by selecting one of two keys (e.g. 1 for read or 2 for search)

Bookmark Function

The device provides the user with the ability to electronically "tag" a certain number of text locations much like a bookmark for quickly and automatically returning to those locations.

The preferred embodiment provides four such bookmark locations. To set a bookmark at a particular location, the "MENU" key is pressed followed by the "B" key. After setting of the bookmark, when the MENU key is pressed, the various set bookmarks appear on the screen. Any one may be selected by pressing the "B" key followed by the numerical key (1 or 2 or 3 or 4) for the desired bookmark.

Figure 2B:
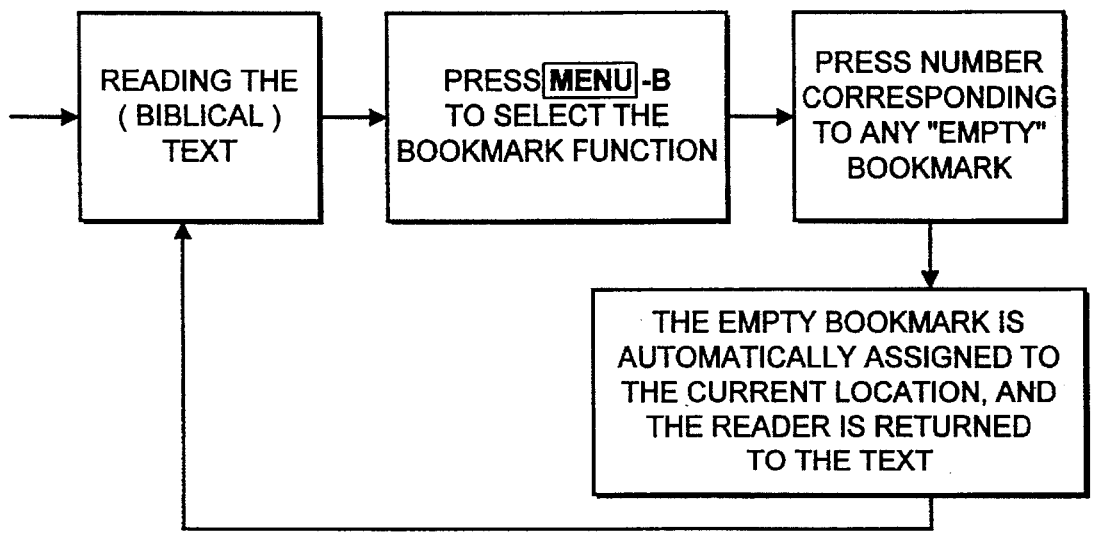
Figure 2B:
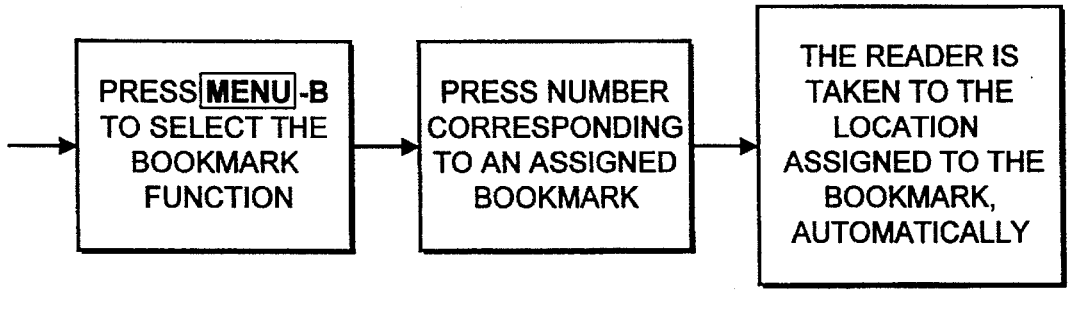

A flow chart is presented in FIG. 2b illustrating the logical steps for setting a bookmark and for going to a marked location.

In determining and using a bookmark, it is understood that there are a given number of "bookmarks" supplied that are each either empty or assigned to a location in the electronic book. Bookmarks are set by first, reading the biblical text; second, pressing menu -B to select the bookmark function; third, pressing a number corresponding to an "empty" bookmark; then the program automatically assigns assigns the empty bookmark to the current location and the reader is returned to the text.

The system permits going to a pre-marked location by first, pressing menu -B to select the bookmark function; second, pressing the number corresponding to an assigned bookmark; third, automatically taking the reader to the location assigned to the bookmark.

Syntax Accommodations

A significant simplification provided by device 10 is the internally programmed provision to accommodate a wide variety of formulations in the "read" mode. For example, I KINGS or KINGS I will get the reader to the same place in the text. The device has a grammar of syntaxes such that all of the following will result in the same read position being brought up on the screen:

IKG
KING I
KG1
FIRST KINGS
I KINGS

The following table illustrates the scope of these syntactical accommodations (=space character(s)):

TABLE I

| I. | Booknames: | | |
|---|---|---|---|
| | 1. Books without "volume number" | May be specified by the full name or any two-or-more character abbreviation that begins with the first character of the name, and omits letters at the user's discretion. The abbreviation will work, provided it is unique to one book. e.g. for the book "MATTHEW", the following are adequate: MT, MAT, MATT, MW, MTW, etc. but not MH, since this could also stand for "MICAH". | |
| | 2. Books with a "volume number" | The book name exclusive of the volume number may be abbreviated as described above. The understood formats for volume number are illustrated below for the book "2 CORINTHIANS" | |
| ROMAN NUMERALS: | | II COR IICOR | COR II (CORII not recognized) |
| SPELLED OUT VOLUME #: | | SECOND COR SECONDCOR | COR SECOND CORSECOND |
| CARDINAL NUMBERS: | | 2 COR 2COR | COR 2 COR2 |
| ORDINAL NUMBERS: | | 2ND COR 2NDCOR | COR 2ND COR2ND |

(Note we have used the "COR" abbreviation for "CORINTHIANS". Any legal abbreviation according to section 1 will work).

| II. | Chapter Specification: | | |
|---|---|---|---|
| | Recognized Formats: | 1. | "1" "5" "26", etc. (simple cardinal numbers) |
| | | 2. | "CHAPTER 5" |
| | | 3. | "CHAP 5", "CHAP5" |
| III. | Verse Specification: | | |
| | Recognized Formats: | 1. | "1", "5", etc. |
| | | 2. | "VERSE 5", "VERSE5" |

Final note:
The book/volume name, chapter specification, and verse specification may but need not be separated from each other by space characters in the user's query.
Exception:
Cardinal numerals (0–9) may not be adjacent if they do not belong to the same number; i.e. the chapter number and verse number must be separated by at least one space if there is no "VERSE" string in between.

Triple Level of Linguistic Range (Search Expansion)

The device will, in the first instance, search a designated word, and its possessive, and its capitalized forms (level 1). An example of a level 1 search is that a search for the word KING will cause a search for the following: king, king's, King, King's, KING. A total of 5 forms are searched simultaneously. It should be noted that level 1 obviates the need for having apostrophe and "shift" keys on the keyboard.

This search may be expanded in two additional ways. A second expanded level (level 2) of a search is provided by pressing the single "?" key, which choice is listed on the MENU (following the pressing of the MENU key). The device expands the search by using all forms (inflections as well as other syntactically related words) of the entered words. For example, the entry of the words MOVE WATER will initially find no correspondence in the search of the bible text. By expansion to include "moved" and "water s", a number of locations in the text corresponding to variations of these words will be found. The search could be started by first entering "MOVE? WATER?" to indicate that all forms of the words are to be searched in level 2. If "move water" were entered initially with no "?"s a rapid way of adding the "?"s to each word without retyping is to press the MENU key and then the "?" key.

A further level of search expansion (level 3) will expand the search by utilizing words which are different but similar in meaning such as provided in a Thesaurus. For example, "water" and "sea" would be equivalent words from this point of view. This is particularly helpful in searching for passages on a given theme in an electronic text or for words recalled from a different translation of the text source. In order to do this, the user is required to insert a double question mark following each word of the search phrase. For example, a phrase which may be entered is "VOICE ?? CALL ?? DESERT ??". This would eventually develop among the various places to be read the following at Isaiah 40:3:

"The voice of him that crieth in the wilderness, Prepare ye the way of the LORD, make straight in the desert a highway for our God."

A more experienced user may wish to mix different search levels in his or her search request. This may be done freely on different words of the query, for example: "VOICE CRY? DESERT??" will also find Isaiah 40.3 (cf., with p. 9, lines 23ff). All three search levels are expressed in this request.

Figure 2C:
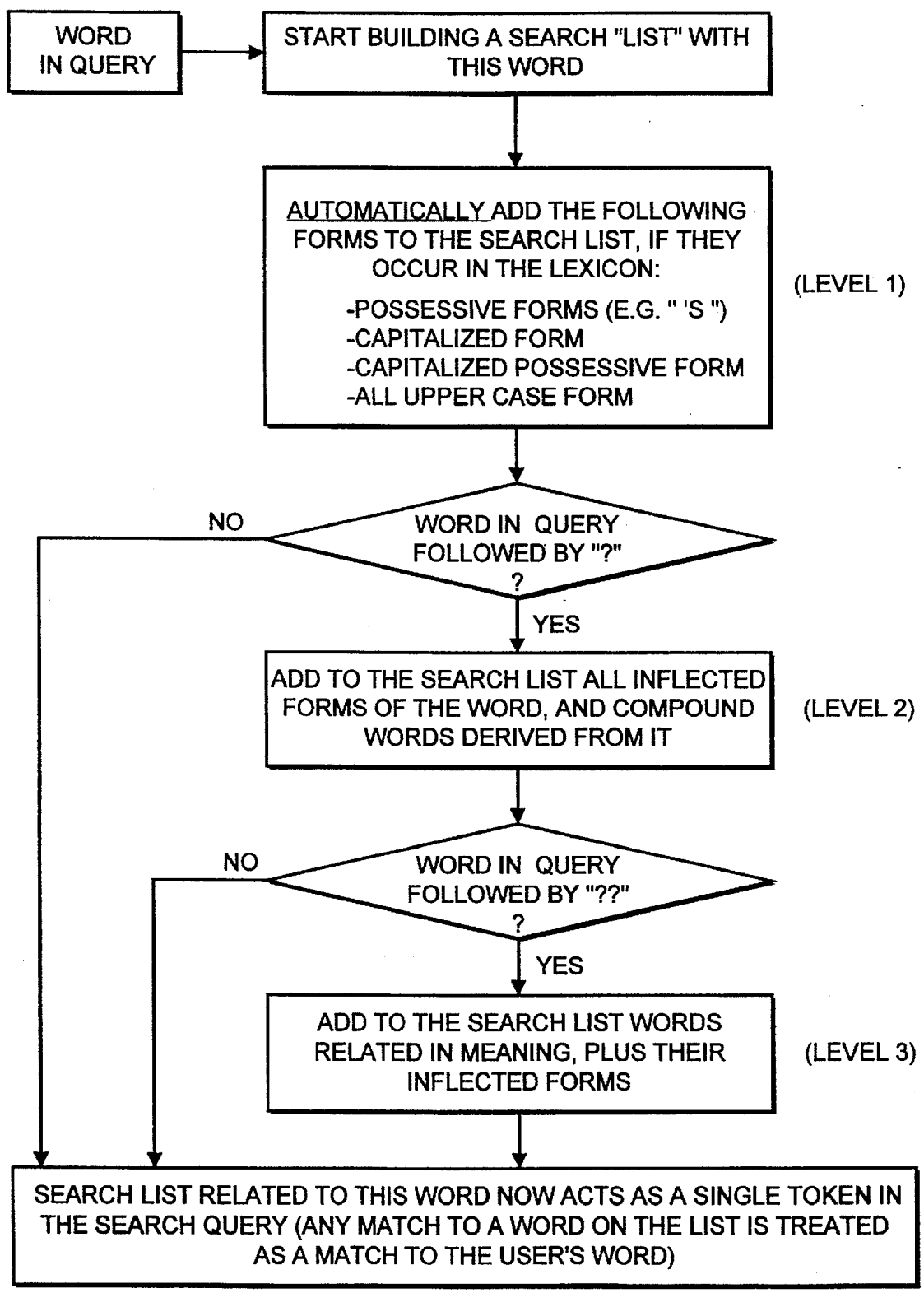

FIG. 2c is a flow chart illustrating the three levels of linguistic range possible with the device.

For each word in a search-mode query, the device will perform the following processing. First, a word is provided by the user as a query. From this, a search "list" is begun to be built with this word. The first level of search list is formed by automatically adding certain forms to the search list if they occur in the lexicon. These include possessive forms, a capitalized form, a capitalized possessive form and an all uppercase form. The word in the query is then followed by a "?" to do a first level search; a "NO" response will take the search list related to this word, which acts as a single token in the search query (any match to a word on the list is treated as a match to the user's word).

If the user responds "YES", then a second level search list is formed which adds to the search list all inflected forms of the word, and compound words derived from it. The word query is then followed by "??" to do a second level search. Once again, a "NO" response will take the search list related to this word to find any match to a word on the list which is treated as a match to the user's word.

If the user responds "YES", added to the search list are words related in meaning plus their inflected forms to generate the third level of search. This level is used to find any match to a word on the list which is treated as a match to the user's word.

Figure 3:
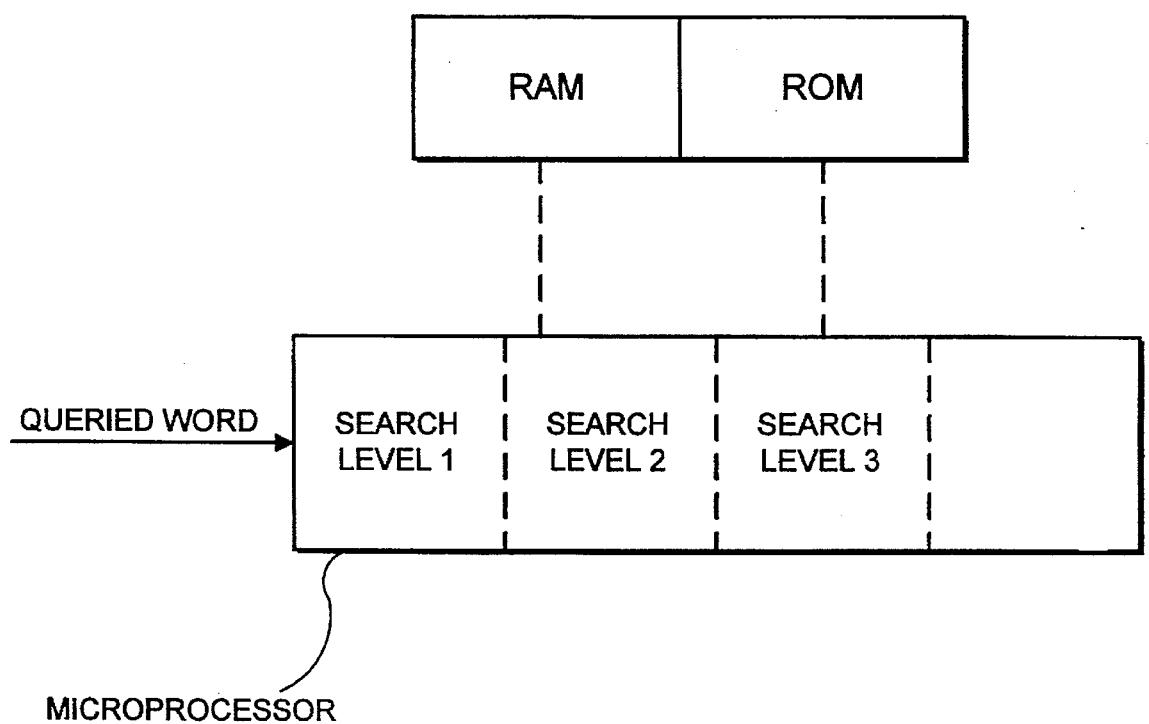
FIG. 3 is a schematic representation showing the multi-level search aspect of the present invention.

In FIG. 3, the system RAM and ROM controls the application of the stored program for the three search levels which are all handled in the microprocessor.

In a further variation of search expansion, the expansion terms may be added or rejected one by one in a non-automatic manual mode. This is known as the "Approvals" mode obtained by first pressing the MENU key followed by the designated key for approvals ("A").

Display Map

In the Biblical embodiment for the electronically stored text, each book that may have text relevant to the entry word or phrase is displayed at a fixed location on the screen. Thus all of the books of the Bible have their own separate positional display location on the screen. The screen location of each book is always fixed. Only those books which are relevant are displayed at any time after a query is submitted by the user. This includes displaying which books contain matches to the user's query. A "flashing" icon representing a particular book selection serves as a cursor to assist the reader to indicate which book the user is in while reading the text. The display map in essence is an animated map of the stored text and provides a continuous "image" of the operational state of the device. The fixed display location for each book and the "flashing" icon representing a book while its text is being read greatly facilitate utilization of the device by the user.

Figure 2D:
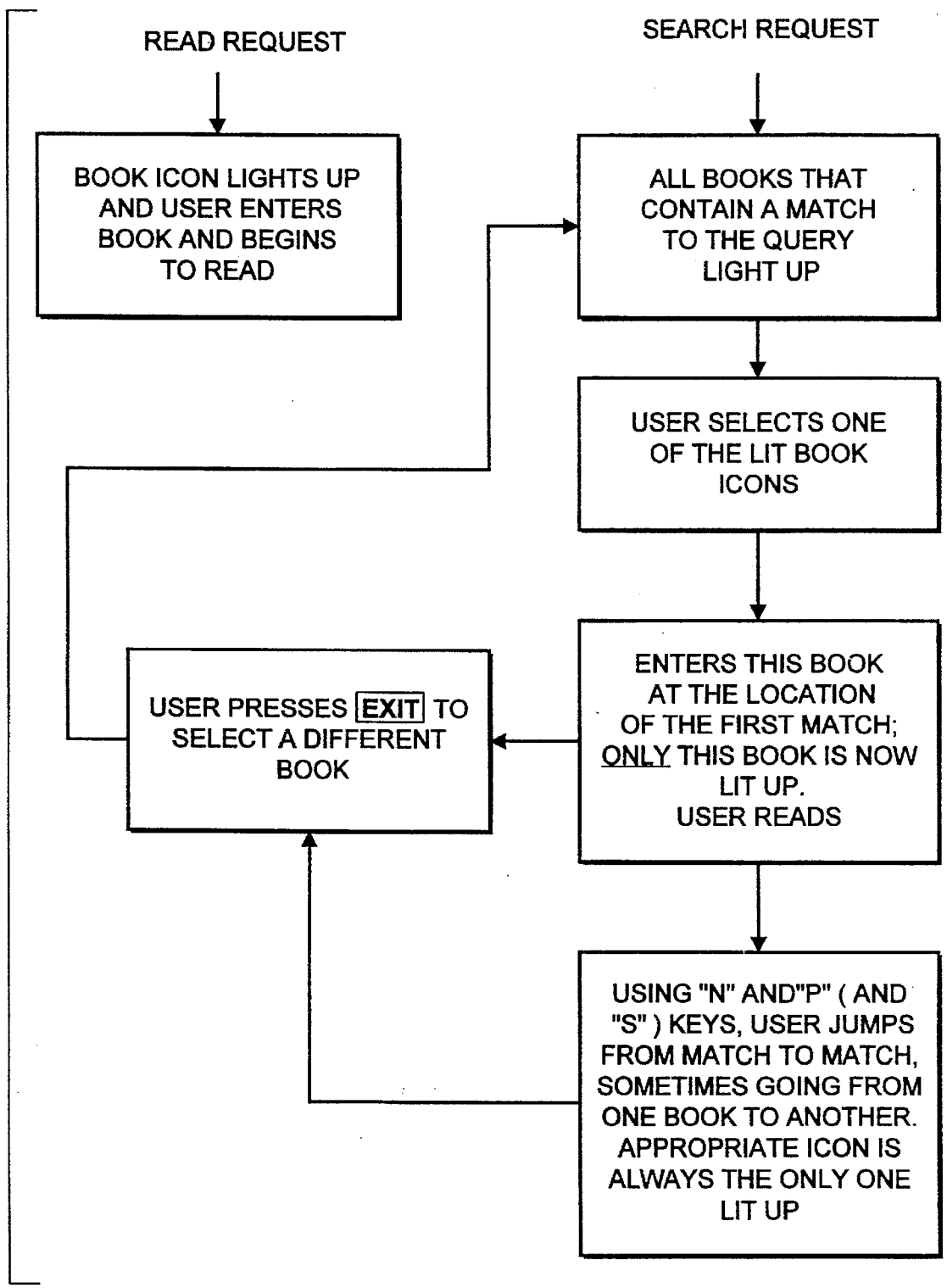

FIG. 2d is a flow chart illustrating the use of the display map in both "read" and "search" modes.

The display map is obtained in read mode in response to a read request. This causes the book icon to light up; the user enters the book and begins to read. In response to a search request, all books which contain a match to the query light up. The user then selects one of the lit book icons. The system enters this book at the location of the first match; only this book icon is then lit up and the user can read. The user can either press "exit" to select a different book or, using "N" and "P" keys (and "S"), the user jumps from match to match, sometimes going from one book to another. The appropriate icon is always the only one lit up. Once again, the user may press "exit" to select a different book.

Search Denotation

A further programmed simplification is that the device will designate, by underlining, which words of a phrase will be searched in the "search" mode. For example, when the phrase "the meek shall inherit the earth" is entered, only the significant terms "meek", "inherit" and "earth" are actually searched. These words are underlined so that the user knows that the search is limited to those three significant words. The device then performs a search limited to only these words of the phrase.

Figure 2E:
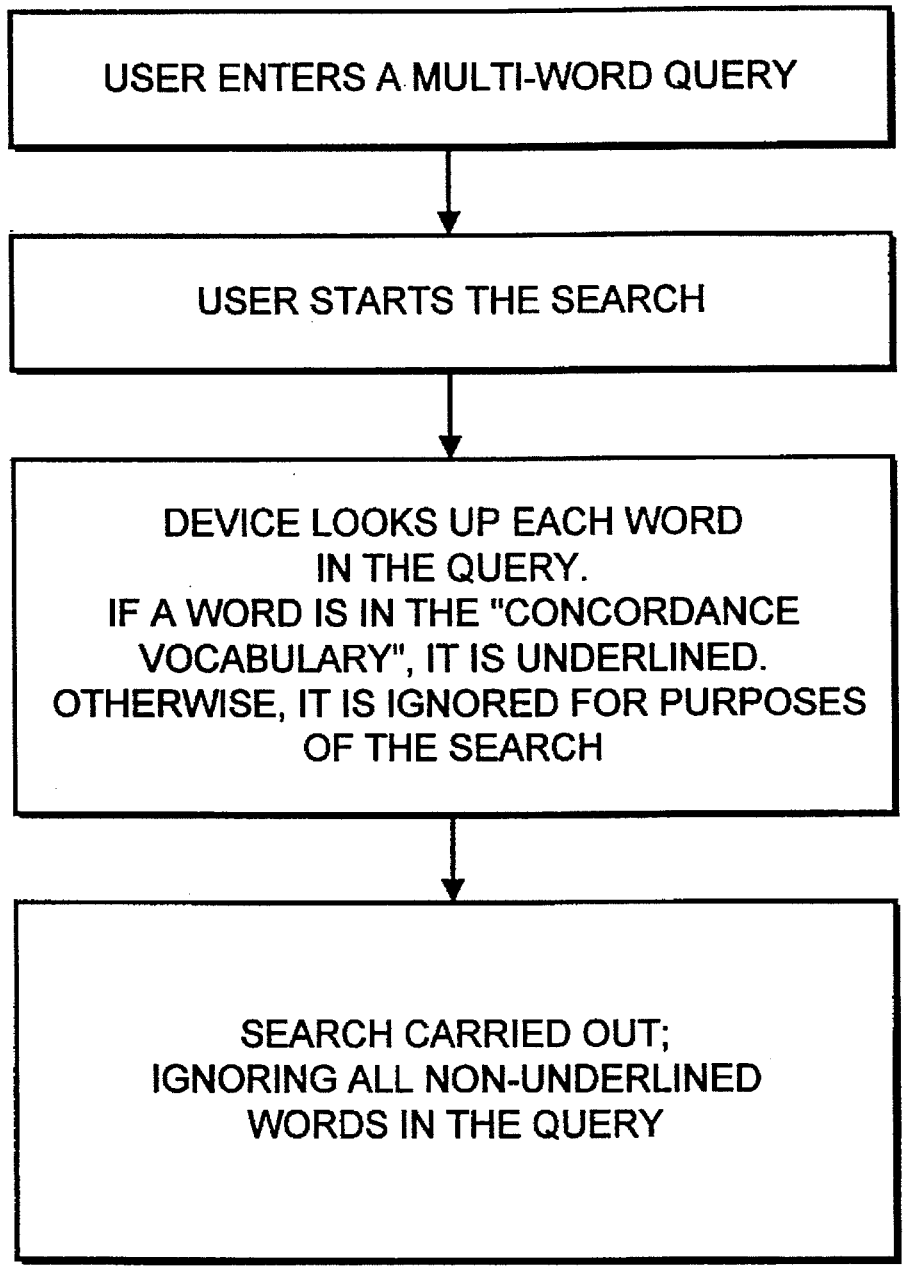

FIG. 2e is a simplified flow chart illustrating how the device will limit a search request.

As indicated in the flow chart, the user enters a multi-word query; the user then starts the search; the system then looks up each word in the query. If a word is in the "concordance vocabulary" it is underlined. Otherwise, it is ignored for the purpose of the search. The search is then carried out, ignoring all non-underlined words in the query.

Context-Sensitive "Help" System

In prior techniques involving reading or searching electronically stored material, the pressing of a "HELP" key would provide descriptive assistance to the user on the screen. Such assistance, however, was of a predetermined, fixed form and was not related to the then current operating situation.

In the present device, by distinctly defining the internal operational phases, user assistance is provided which is directly related to the current operational point reached by the user. The user is provided with appropriate options related to the operational point reached.

Figure 2F:
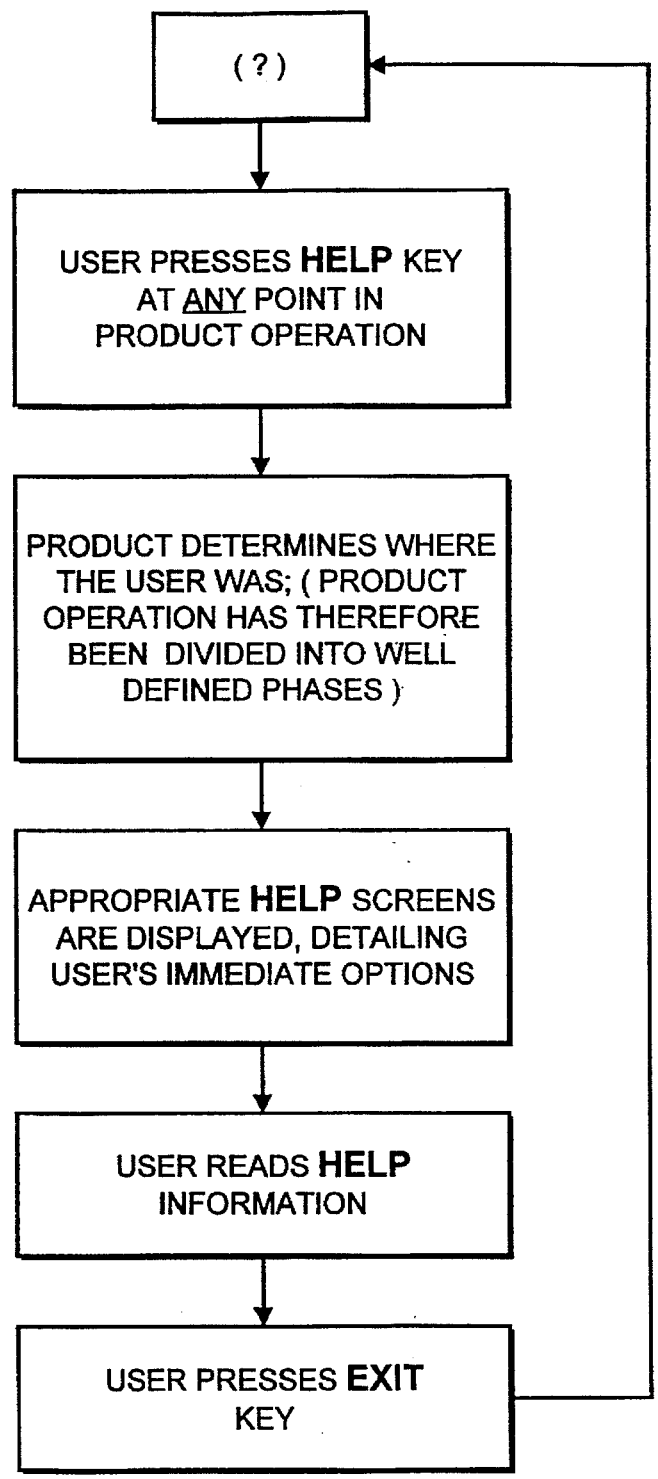
Figure 2G:
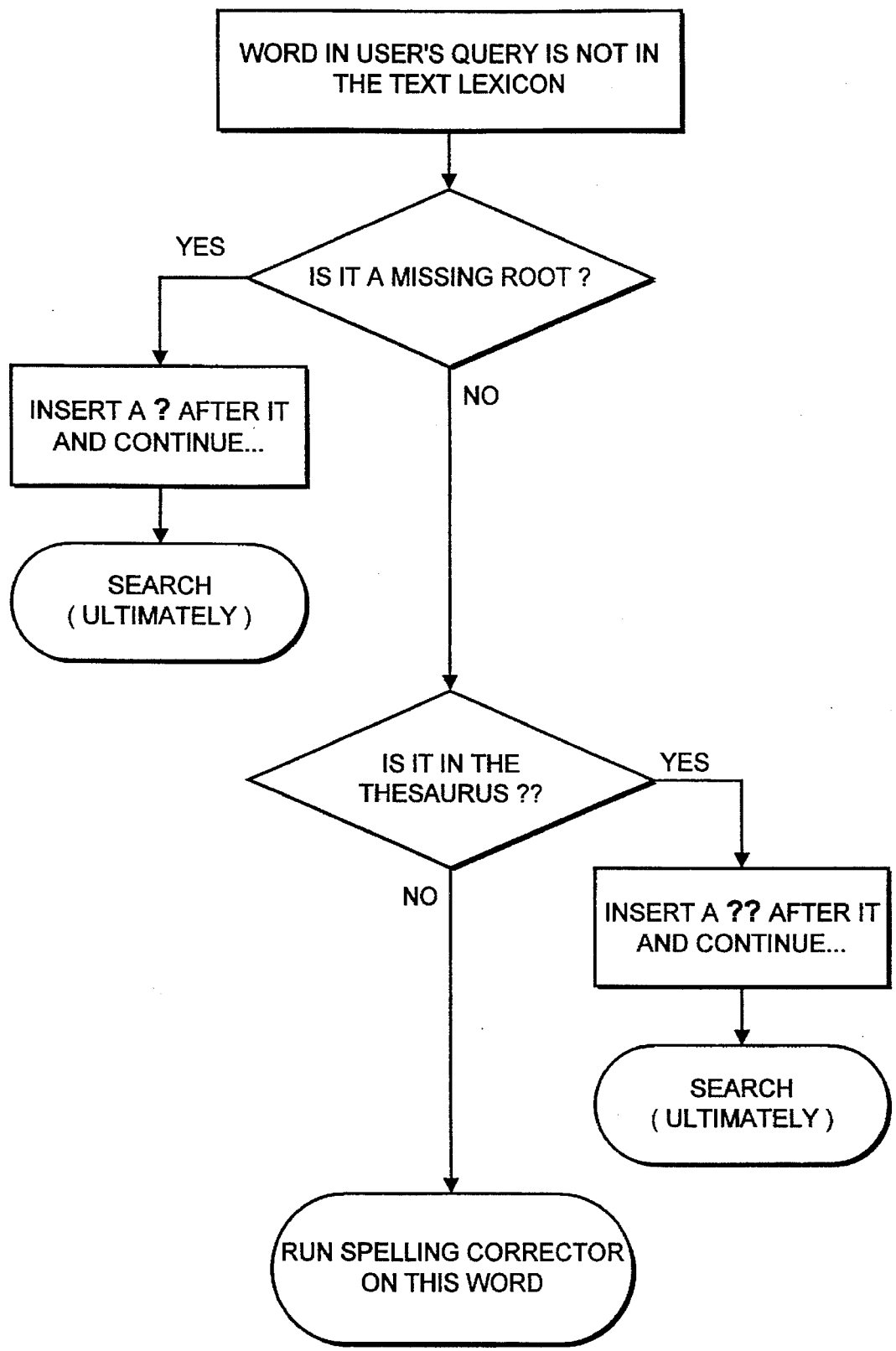

FIG. 2f provides a flow chart for illustrating this context-sensitive "Help" system.

Assuming a question on the part of the user, he or she presses a "HELP" key at any point in the operation. The system then determines where the user was (thus essentially divides the operation into well-defined phases). Appropriate HELP screens are then displayed providing various immediate options to the user. The user then reads the HELP information. The user, following use of the HELP information then may press the EXIT key. It is also possible to press HELP while searching HELP information and receive information about the HELP system.

"Pruning" of Linguistic Range Expansion

The flow charts (2c, 2g) make reference to "the lexicon", (well defined in the simultaneously filed application incorporated by reference herein), i.e., the product's internal lexicon of words making up the text. Linguistic range expansion is always, at each step, "pruned" by the lexicon, as further illustrated in flow chart 2g. This pruning happens quasi-automatically as programmed into the device.

In the flow chart, the input is that the word in the user's query is not in the text lexicon. It is then determined if it is a missing root. If so, a "?" is added automatically which generates a level 2 search.

If not, it is then checked to see if it is in the thesaurus. If so, a "??" is added automatically generating a level 3 search. If not, the spelling correction is run for this word.

If any word in the user's query is not found in the lexicon of the text, a series of steps is performed as follows:

1. The device has a list of "missing root words". These are words which have inflected forms that occur in the text, but the simplest form does not; e.g. the word "babble" is not in the Bible, but "babbler" is. If the user's word is one of the "missing roots" (like babble), a single ? is added absolutely automatically by the device, which generates a level 2 search with no keystrokes pressed.

2. If the word does not match the missing root list, then it is checked to see if it occurs in the thesaurus. If it occurs, a double ? is added, generating an automatic level 3 search.

3. If both steps 1 and 2 fail, then the device assumes a misspelling, and the spelling corrector is run.

The Annexed Listings (Appendix A)

Appendix A is a microfiche version of all of the listings required for programming a complete electronic book (Bible) including the inventive features described above the listings are in two parts: a Program Listing (approximately 200 pages) of the internal operations of the device and a Primary Compression Method Listing (approximately 92 pages) for compression of the Biblical text. The inventive features of the present application are included in the first listing together with other functions (e.g. display, enter etc.) not forming part of this invention. The Appendix A listing is primarily in C code with a small amount of assembly code.

The above embodiment of an electronic text, the Bible, is only one example of the general case of electronic stored text information. The "book, chapter and verse" reflects, in terms of the Biblical embodiment, the fact that in a text, locations are often specified with multiple components (some of them omittable).

While the foregoing description and drawings represent the preferred embodiments of the present invention, it will be obvious to those skilled in the art that various changes and modifications may be made therein without departing from the true spirit and scope of the present invention.

What is claimed is:

1. In a method for providing user access to stored textual information in a hand-held electronic book having a digital memory, entry keys, a display screen and a microprocessor for implementing the method, said method having search and read modes of access to said textual information to allow steps of searching and using said textual information by a user, the improvement comprising the steps of:

a. performing a search of textual information using at least one queried word, each queried word being searched at a user determined search level selected from the levels of search consisting of:
  i. a first level of search encompassing a queried word, and possessive and capitalized versions of the queried word;
  ii. a second level of search encompassing additional forms of the queried word including inflected forms; and,
  iii. a third level of search encompassing words unrelated to the queried word but having the same meaning; and
b. automatically expanding the search performed in step a. for each queried word not found in the textual information by changing the level of search for each queried word changed at the first level according to the following:
  i. changing the level of search of each queried word which is a missing root to the second level of search; and
  ii. changing the level of search of each queried word which is not a missing root and which is in a thesaurus to the third level of search, and repeating step a. to perform an expanded search.

2. In a device for providing user access to stored textual information in a hand-held electronic book having a digital memory, entry keys, a display screen and a microprocessor, said device having search and read modes of access to said textual information to allow searching and using said textual information by a user, the improvement comprising:

a. means for performing a search of textual information using at least one queried word, each queried word being searched at a user determined search level selected from the levels of search consisting of:
  i. a first level of search encompassing a queried word, and possessive and capitalized versions of the queried word;
  ii. a second level of search encompassing additional forms of the queried word including inflected forms; and,
  iii. a third level of search encompassing words unrelated to the queried word but having the same meaning; and
b. means for automatically expanding the search performed in step a. for each queried word not found in the textual information by changing the level of search for each queried word searched at the first level according to the following:
  i. changing the level of search of each queried word which is a missing root to the second level of search; and
  ii. changing the level of search of each queried word which is not a missing root and which is in a thesaurus to the third level of search.

* * * * *